(12) United States Patent
Yamamoto et al.

(10) Patent No.: US 8,995,471 B2
(45) Date of Patent: Mar. 31, 2015

(54) SHELF OF A NETWORK SYNCHRONIZATION DEVICE, AND NETWORK SYNCHRONIZATION DEVICE

(75) Inventors: Nobuyuki Yamamoto, Kamakura (JP); Masafumi Kamakura, Yokohama (JP); Yoshihiro Ashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 422 days.

(21) Appl. No.: 13/449,831

(22) Filed: Apr. 18, 2012

(65) Prior Publication Data

US 2012/0275473 A1 Nov. 1, 2012

(30) Foreign Application Priority Data

Apr. 26, 2011 (JP) ................... 2011-098056

(51) Int. Cl.
*H04J 3/06* (2006.01)
*H04L 7/00* (2006.01)

(52) U.S. Cl.
CPC ............. *H04J 3/0688* (2013.01); *H04L 7/0012* (2013.01)
USPC .......................................... 370/503; 370/496

(58) Field of Classification Search
USPC ................................. 370/496, 503
See application file for complete search history.

(56) References Cited

U.S. PATENT DOCUMENTS

| 7,145,920 B2 * | 12/2006 | Kinoshita et al. ............. 370/503 |
| 2002/0154358 A1 | 10/2002 | Hino |
| 2005/0071704 A1 * | 3/2005 | Friesen et al. ................ 713/400 |
| 2009/0297161 A1 * | 12/2009 | Ojima ........................... 398/135 |
| 2010/0142948 A1 * | 6/2010 | Chen et al. ...................... 398/45 |

FOREIGN PATENT DOCUMENTS

| JP | 04-307823 A | 10/1992 |
| JP | 11-205317 A | 7/1999 |
| JP | 2002-319909 A | 10/2002 |

OTHER PUBLICATIONS

Japanese Office Action received in Japanese Application No. 2011-098056 dated Jan. 28, 2014.

* cited by examiner

*Primary Examiner* — Michael Thier
*Assistant Examiner* — Brian Cox
(74) *Attorney, Agent, or Firm* — Mattingly & Malur, P.C.

(57) ABSTRACT

A shelf of a network synchronization device includes: a clock input reception unit which receives an input of a clock signal; a clock output unit which outputs a clock signal; a clock interruption detection unit which detects a clock interruption if the clock input reception unit does not receive a clock; an AIS signal detection unit which detects an AIS signal if the AIS signal is received through the clock input reception unit; an AIS signal generation unit which generates the AIS signal; an alarm control unit which outputs a predetermined alarm notification when the AIS signal detection unit does not detect the AIS signal if the clock interruption detection unit detects the clock interruption; and an output signal selection unit which outputs the AIS signal generated by the AIS signal generation unit to the clock output unit if the clock interruption detection unit detects the clock interruption.

13 Claims, 10 Drawing Sheets

CORRESPONDENCE TABLE

| | | | MASKING INSTRUCTION SIGNAL | | | |
|---|---|---|---|---|---|---|
| | | | N-SYSTEM | | E-SYSTEM | |
| | | | PRESENT | ABSENT | PRESENT | ABSENT |
| INTERRUPTION DETECTION SIGNAL | N-SYSTEM | PRESENT | N-SYSTEM ALARM NOTIFICATION MASKING | N-SYSTEM ALARM NOTIFICATION | | |
| | E-SYSTEM | PRESENT | | | E-SYSTEM ALARM NOTIFICATION MASKING | E-SYSTEM ALARM NOTIFICATION |

FIG. 10

SHELF OF A NETWORK SYNCHRONIZATION DEVICE, AND NETWORK SYNCHRONIZATION DEVICE

INCORPORATION BY REFERENCE

This application claims priority based on a Japanese Patent Application No. 2011-098056 filed on Apr. 26, 2011, the entire contents of which are incorporated by reference herein.

BACKGROUND OF THE INVENTION

The present invention relates to a technology for controlling a network synchronization device.

Up to now, there is a technology in which a multiplexer receives a clock from a master network synchronization device to maintain synchronization, and transmits data including clock information to another multiplexer through a data transmission line, and the another multiplexer extracts the clock from the data received through the data transmission line to maintain synchronization. In the above-mentioned configuration, when it is detected that a clock of the master network synchronization device has been interrupted, a remote alarm indication (RAI) signal is sent to the data transmission line, and when a slave network synchronization device receives the RAI signal, a clock of the slave network synchronization device is employed (Japanese Patent Laid-open Publication No. H11-205317).

SUMMARY OF THE INVENTION

However, in the above-mentioned technology, a clock interruption is detected and an alarm notification is issued also on the slave network synchronization device that has received the RAI signal, which causes an unnecessary alarm to be reported on the slave network synchronization device.

It is an object of the present invention to provide a technology for interrupting an unnecessary alarm notification due to a clock interruption.

In order to solve the above-mentioned problem, according to an exemplary embodiment of the present invention, there is provided a shelf of a network synchronization device, including: a clock input reception unit which receives an input of a clock signal; a clock output unit which outputs a clock signal; a clock interruption detection unit which detects a clock interruption in a case where the clock input reception unit does not receive a clock; an AIS signal detection unit which detects an AIS signal in a case where the AIS signal is received through the clock input reception unit; an AIS signal generation unit which generates the AIS signal; an alarm control unit which outputs a predetermined alarm notification when the AIS signal detection unit does not detect the AIS signal in a case where the clock interruption detection unit detects the clock interruption; and an output signal selection unit which outputs the AIS signal generated by the AIS signal generation unit to the clock output unit in the case where the clock interruption detection unit detects the clock interruption.

According to the exemplary embodiment of the present invention, it is possible to interrupt an unnecessary alarm notification issued on the network synchronization device to thereby quickly identify a failure site.

DESCRIPTION OF THE PREFERRED EMBODIMENTS

Hereinafter, a shelf 1 constituting a network synchronization device to which a first embodiment according to the present invention is applied is described with reference to the accompanying drawings.

Figure 1:
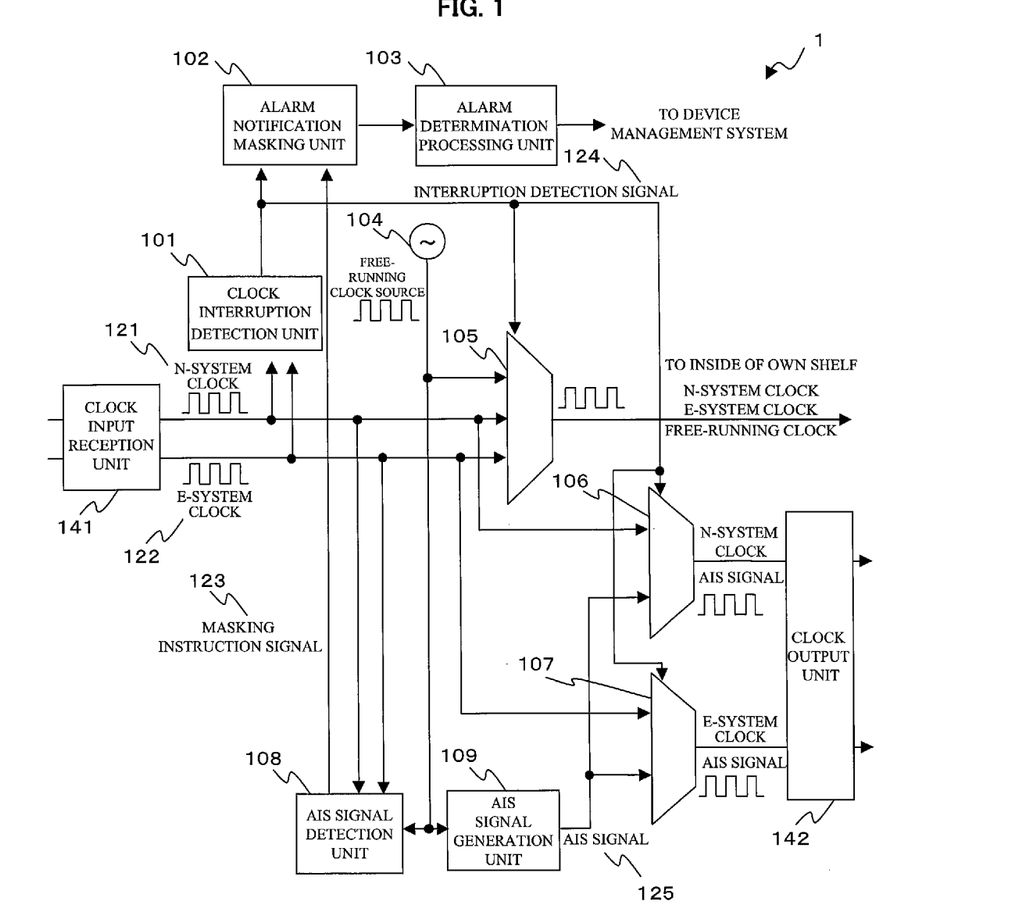
FIG. 1 is a diagram illustrating an outline of a configuration of a shelf.

FIG. 1 is a diagram illustrating the shelf 1 constituting the network synchronization device according to the first embodiment of the present invention. Note that, a data communication line (not shown) for performing data communications based on frame control or the like with an upstream device and a downstream device is separately connected to the shelf 1.

Figure 2:
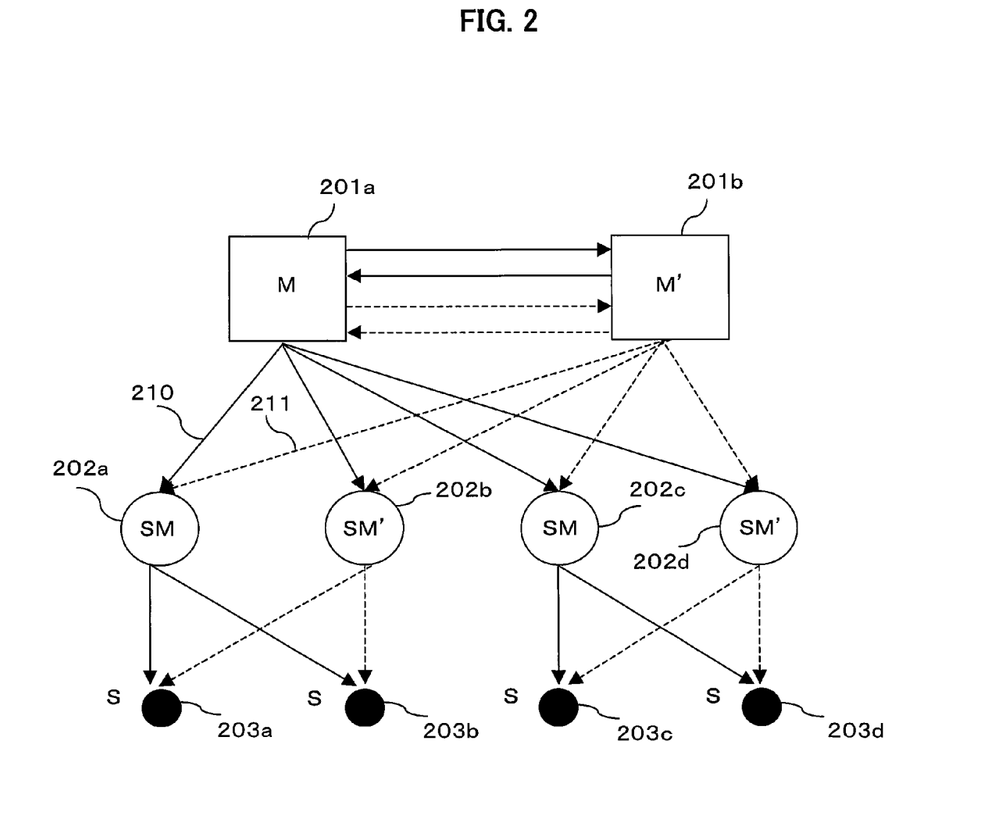
FIG. 2 is a diagram illustrating a mechanism for distributing network synchronization clocks under a master-slave synchronization scheme.

The shelf 1 according to the first embodiment of the present invention is a device incorporated into a mechanism for distributing network synchronization clocks under such a master-slave synchronization scheme as illustrated in FIG. 2. For distribution of the network synchronization clocks, an active-system (hereinafter, referred to as "N-system") master station 201a and a standby-system (hereinafter, referred to as "E-system") master station 201b generate reference clocks used for network synchronization as an N-system clock and an E-system clock, respectively. Then, the N-system master station 201a and the E-system master station 201b use clock lines dedicated to clock transmission to distribute the reference clocks as an N-system clock 210 and an E-system clock 211 to each of predetermined sub-master stations (SMs) 202a to 202d dependent on the reference clock. Note that, as illustrated in FIG. 2, the N-system master station 201a and the E-system master station 201b transmit the N-system clock and the E-system clock to each other to maintain synchronization of the clocks as much as possible.

Figure 3:
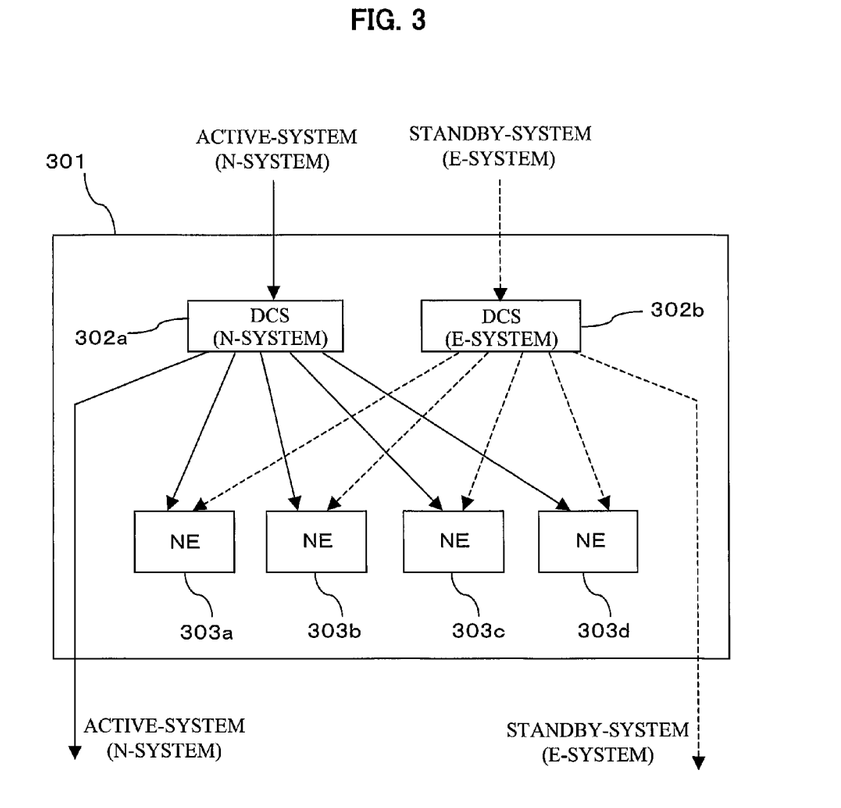
FIG. 3 is a diagram illustrating a mechanism for distributing the network synchronization clocks within a station.

FIG. 3 is a diagram illustrating a mechanism for distributing the network synchronization clocks within a station under such a clock distribution scheme. As illustrated in a sub-master station 301 of FIG. 3, the sub-master stations 202a to 202d each receive the N-system and E-system clocks from the N-system master station 201a and the E-system master station 201b via a digital clock supply (DCS) (N-system) 302a and a DCS (E-system) 302b. Then, the sub-master station 301 corresponding to each of the sub-master stations 202a to 202d distributes the clocks to respective network devices (NEs) 303a to 303d within the own station via the DCS (N-system)

302a and the DCS (E-system) 302b to realize the network synchronization. Further, the sub-master station 301 of each of the sub-master stations 202a to 202d distributes the N-system clock 210 and the E-system clock 211 to a slave station 203a and a slave station 203b or a slave station 203c and a slave station 203d, which are dependent thereon in the downstream, via the DCS (N-system) 302a and the DCS (E-system) 302b.

The slave stations 203a to 203d each have substantially the same configuration as the sub-master station 301 illustrated in FIG. 3, and distribute the N-system and E-system clocks received from the sub-master station 301 of any one of the sub-master stations 202a to 202d to the respective network devices (NE) within the own station to realize the network synchronization. Note that, although not illustrated explicitly in FIG. 2, the clocks may be distributed to slave stations further dependent on each of the slave stations 203a to 203d.

Figure 4:
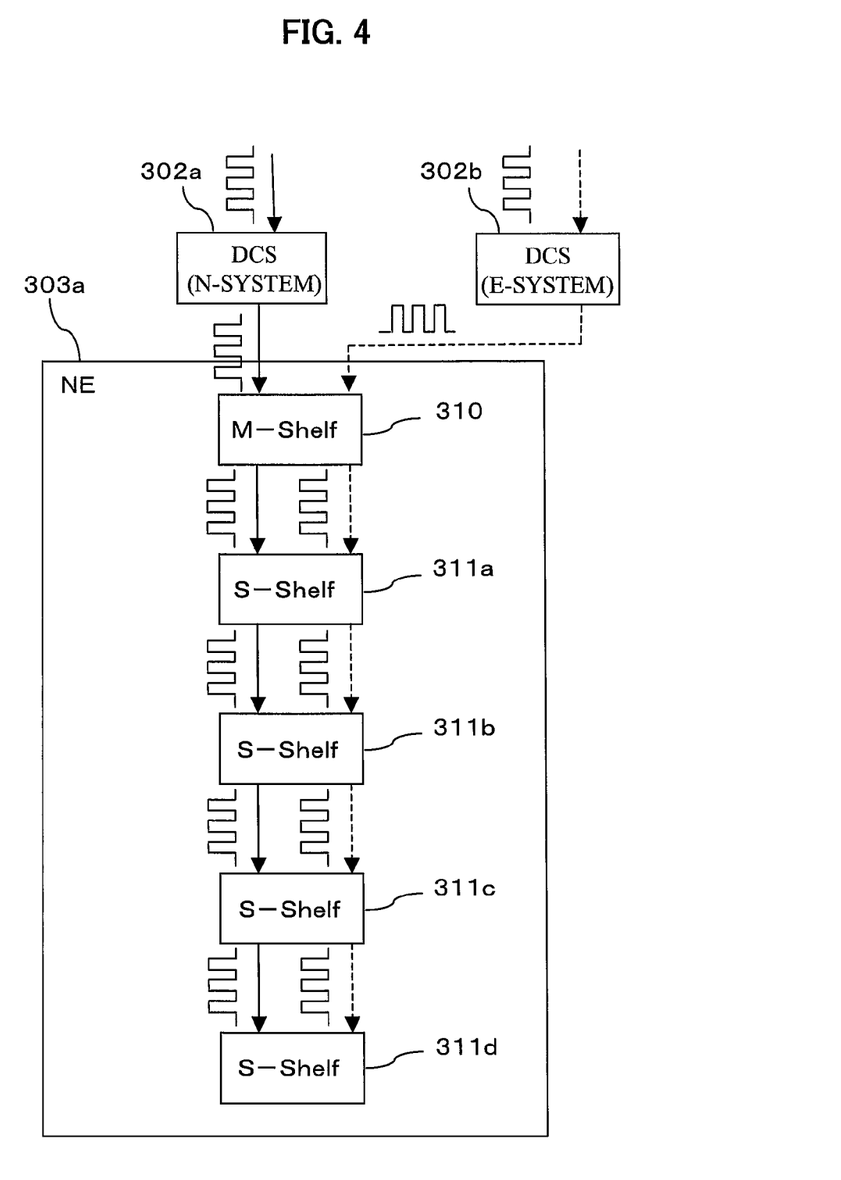
FIG. 4 is a diagram illustrating a flow of distribution of the network synchronization clocks within a network device.

FIG. 4 is a diagram illustrating a flow of the distribution of the network synchronization clocks within a network device (NE) 303a. As illustrated in FIG. 4, one NE node includes at least one shelf. In the case where the NE node includes a plurality of shelves, the clocks need to be further distributed to the plurality of shelves within the NE. Therefore, as illustrated in FIG. 4, within the NE 303a, the N-system clock and the E-system clock are distributed from a master shelf (M-Shelf) 310 that receives both the N-system clock 210 and the E-system clock 211 to slave shelves (S-shelves) 311a to 311d that are connected in a cascaded manner. Note that, the M-Shelf 310 basically has the same configuration as each of the S-Shelves 311a to 311d. Therefore, one of the shelves included in the network device 303a becomes the M-Shelf 310, and the other shelves are dependent on the M-Shelf 310 in series by cascade connection.

The shelf 1 according to the first embodiment of the present invention is such a shelf as to constitute the NE 303a. The shelf 1 includes a clock interruption detection unit 101, an alarm notification masking unit 102, an alarm determination processing unit 103, a free-running clock source 104, an intra-own shelf clock selection unit 105, an N-system clock selection unit 106, an E-system clock selection unit 107, an alarm indication signal (AIS) signal detection unit 108, an AIS signal generation unit 109, a clock input reception unit 141, and a clock output unit 142. Note that, in this embodiment, a plurality of shelves are cascade-connected and constitute the NE 303a serving as a single network synchronization device.

A normal-system (N-system) clock 121 and an emergency-system (E-system) clock 122 are input to the shelf 1 through clock lines dedicated to distribution of the clocks from an upstream shelf or a DCS connected to the network synchronization device via the clock input reception unit 141 for receiving a clock input from an external portion. Here, the N-system clock 121 is an active-system clock among the clocks used for the network synchronization, and the E-system clock 122 is a standby-system clock among the clocks used for the network synchronization. Therefore, in a normal operation state, the network synchronization device and the shelf 1 operate based on the N-system clock, and distribute both the N-system clock and the E-system clock to another downstream device such as a network synchronization device dependent on the network synchronization device through the clock lines dedicated to the distribution of the clocks.

The clock interruption detection unit 101 is a control unit for detecting interruptions of the N-system clock and the E-system clock. In a case where there is no clock being input continuously to the clock line for a predetermined interruption detection period (for example, three-clock cycle), the clock interruption detection unit 101 detects that the clock has been interrupted, and outputs an interruption detection signal 124 to the alarm notification masking unit 102, the intra-own shelf clock selection unit 105, the N-system clock selection unit 106, and the E-system clock selection unit 107. Further, when a clock signal is continuously input to the clock line in a state of a clock interruption, the clock interruption detection unit 101 detects that the clock has recovered, and stops outputting the interruption detection signal 124 that has been output to the alarm notification masking unit 102, the intra-own shelf clock selection unit 105, the N-system clock selection unit 106, and the E-system clock selection unit 107.

The alarm notification masking unit 102 receives the interruption detection signal 124 output from the clock interruption detection unit 101 and a masking instruction signal 123 output from the AIS signal detection unit 108, and controls outputting of an alarm signal to the alarm determination processing unit 103 based on a predetermined condition.

Figure 5:
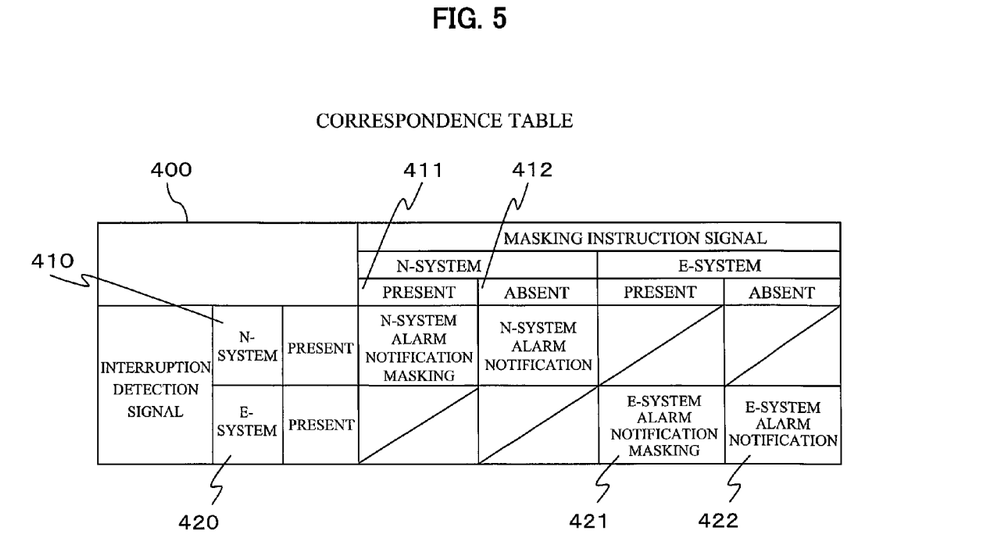
FIG. 5 is a diagram of a correspondence between an alarm notification condition and an alarm operation at an occurrence of a clock interruption.

Specifically, as illustrated in a correspondence table 400 of FIG. 5, when each of an interruption detection signal 410 of the N-system clock and an interruption detection signal 420 of the E-system clock is input from the clock interruption detection unit 101, the alarm notification masking unit 102 controls an alarm output depending on whether or not there is an interruption detection signal for the clock of each system and whether or not there is a masking instruction signal of each system.

More specifically, when the interruption detection signal of the N-system clock is input thereto, the alarm notification masking unit 102 masks an N-system alarm notification to avoid the alarm output in a case where an N-system masking instruction signal is input thereto from the AIS signal detection unit 108 (in a case where the N-system masking instruction signal is "present" 411 in FIG. 5). In contrast, the alarm notification masking unit 102 performs the alarm output without masking the N-system alarm notification in a case where the N-system masking instruction signal is not input thereto from the AIS signal detection unit 108 (in a case where the N-system masking instruction signal is "absent" 412 in FIG. 5).

In the same manner, when the interruption detection signal of the E-system clock is input thereto, the alarm notification masking unit 102 masks an E-system alarm notification to avoid the alarm output in a case where an E-system masking instruction signal is input thereto from the AIS signal detection unit 108 (in a case where the E-system masking instruction signal is "present" 421 in FIG. 5). In contrast, the alarm notification masking unit 102 performs the alarm output without masking the E-system alarm notification in a case where the E-system masking instruction signal is not input thereto from the AIS signal detection unit 108 (in a case where the E-system masking instruction signal is "absent" 422 in FIG. 5).

The alarm determination processing unit 103 acquires alarm output information from the alarm notification masking unit 102, and when the alarm output information satisfies the predetermined condition, outputs alarm information to a device management system (not shown). Specifically, when the alarm output regarding the clock interruptions of the N-system and the E-system from the alarm notification masking unit 102 is continuously received for equal to or longer than a predetermined notification protection period (for example, period equal to or longer than twice as long as a period sufficient for an AIS signal to rise from the clock interruption, such as 16-clock cycle), the alarm determination processing unit 103 generates the alarm information including information identifying the system for which the alarm output has been issued and information indicating that the clock interruption has occurred in the identified system, and notifies the device management system thereof.

The free-running clock source 104 generates a free-running clock of the shelf 1 for enabling the shelf 1 to operate solely. The free-running clock source 104 is a so-called clock generation device such as a crystal oscillator module, a pulse generator, or a function generator. The free-running clock source 104 is a clock having the same frequency as both the N-system clock and the E-system clock.

The intra-own shelf clock selection unit 105 selectively outputs any one of a free-running clock output from the free-running clock source 104, the N-system clock 121, and the E-system clock 122 as an input clock. The intra-own shelf clock selection unit 105 receives the interruption detection signal 124 and selects the clock to be output based on the interruption detection signal. The intra-own shelf clock selection unit 105 outputs the N-system clock 121 when the interruption detection signal 124 is a signal indicating that none of the N-system clock 121 and the E-system clock 122 has been interrupted or a signal indicating that only the E-system clock 122 has been interrupted, outputs the E-system clock 122 when the interruption detection signal 124 is a signal indicating that only the N-system clock 121 has been interrupted, or outputs the free-running clock as an output clock when the interruption detection signal 124 is a signal obtained by detecting that both the N-system clock 121 and the E-system clock 122 have been interrupted.

The N-system clock selection unit 106 receives the N-system clock 121 and an AIS signal 125 output from the AIS signal generation unit 109 as the input clock, and selectively outputs any one of the clocks. The N-system clock selection unit 106 receives the interruption detection signal 124 and selects the clock to be output based on the interruption detection signal. The N-system clock selection unit 106 outputs the N-system clock 121 when the interruption detection signal 124 is the signal indicating that none of the N-system clock 121 and the E-system clock 122 has been interrupted or the signal indicating that only the E-system clock 122 has been interrupted, or outputs the AIS signal 125 as the output clock when the interruption detection signal 124 is the signal indicating that only the N-system clock 121 has been interrupted or the signal obtained by detecting that both the N-system clock 121 and the E-system clock 122 have been interrupted. Note that, the output clock is output to a device such as a downstream shelf via the clock output unit 142 for outputting a signal such as a clock.

The E-system clock selection unit 107 receives the E-system clock 122 and the AIS signal 125 output from the AIS signal generation unit 109 as the input clock, and selectively outputs any one of the clocks. The E-system clock selection unit 107 receives the interruption detection signal 124 and selects the clock to be output based on the interruption detection signal. The E-system clock selection unit 107 outputs the E-system clock 122 when the interruption detection signal 124 is the signal indicating that none of the N-system clock 121 and the E-system clock 122 has been interrupted or the signal indicating that only the N-system clock 121 has been interrupted, or outputs the AIS signal 125 as the output clock when the interruption detection signal 124 is the signal indicating that only the E-system clock has been interrupted or the signal obtained by detecting that both the N-system clock 121 and the E-system clock 122 have been interrupted. Note that, the output clock is output to the device such as a downstream shelf via the clock output unit 142 for outputting a signal such as a clock.

The AIS signal detection unit 108 monitors transfers of the AIS signal on an N-system clock line and an E-system clock line, and upon detection of a signal having the same cycle as the AIS signal having a predetermined cycle (for example, eight-clock cycle), outputs the masking instruction signal 123 to the alarm notification masking unit 102. Note that, the AIS signal detection unit 108 finishes outputting the masking instruction signal 123 when the AIS signal is no longer detected and when a normal clock is detected for a predetermined period (for example, three cycles).

Figure 6A:
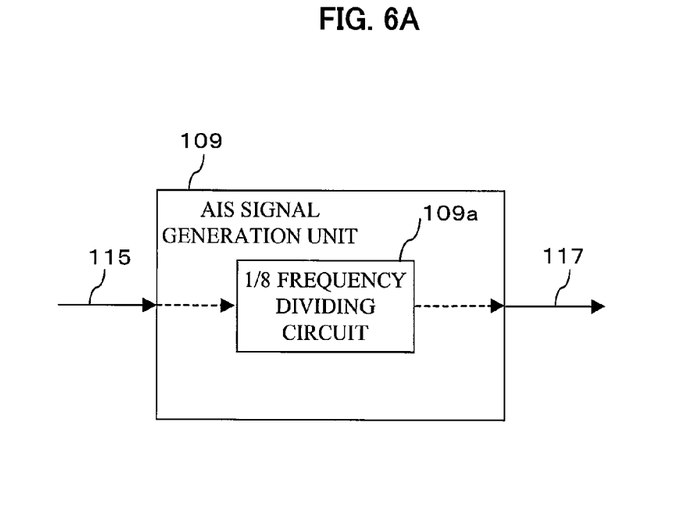
FIGS. 6A and 6B are diagrams illustrating a configuration of an AIS signal generation unit and an example of input/output signals.

The AIS signal generation unit 109 is supplied with the free-running clock by the free-running clock source 104, and generates an AIS signal having a predetermined frequency to be output to the N-system clock selection unit 106 and the E-system clock selection unit 107. As illustrated in FIG. 6A, the AIS signal generation unit 109 includes a ⅛ frequency dividing circuit 109a, an input transmission line 115 for inputting a signal to the AIS signal generation unit 109, and an output transmission line 117 for outputting a signal from the AIS signal generation unit 109. The free-running clock input from the input transmission line 115 is ⅛-frequency-divided, in other words, has the frequency changed to a lower level, and is output from the output transmission line 117 as the AIS signal. Note that, a frequency division ratio at which the AIS signal generation unit 109 frequency-divides the free-running clock is not limited to the above-mentioned ⅛ frequency division. For example, the frequency division ratio may be set so that the AIS signal has a cycle equal to or longer than twice as long as the interruption detection period for which the clock interruption detection unit 101 detects the clock interruption. It is desired that the frequency division ratio may be set so that the AIS signal has a cycle approximately twice as long as clocks obtained by adding a one-clock cycle to the interruption detection period.

Figure 6B:
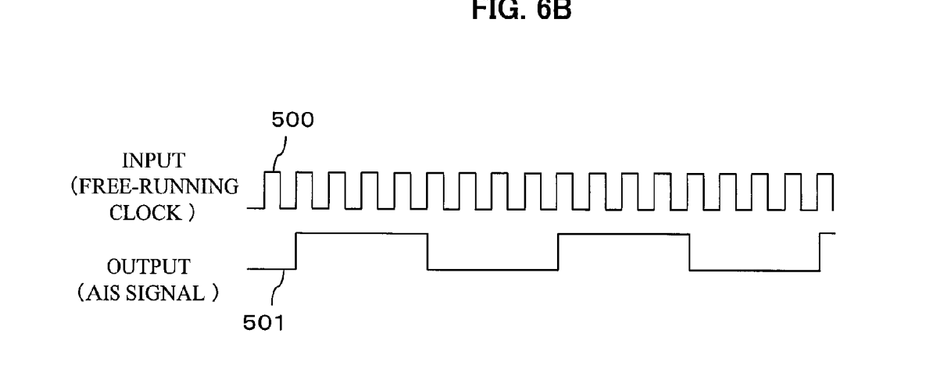

FIG. 6B illustrates a timing chart representing a waveform of a free-running clock 500 being an input to the AIS signal generation unit 109 and a waveform of an output signal 501 from the AIS signal generation unit 109. The input free-running clock 500 has the frequency set to one eighth by the AIS signal generation unit 109 and is output as the AIS signal.

The shelf 1 is configured as described. In this configuration, the clock interruption detection unit 101, the alarm notification masking unit 102, the alarm determination processing unit 103, the intra-own shelf clock selection unit 105, the N-system clock selection unit 106, the E-system clock selection unit 107, the AIS signal detection unit 108, the clock input reception unit 141, and the clock output unit 142 are implemented by, for example, various switch circuits or hardware electronic circuits such as ASICs. Further, the free-running clock source 104 is implemented by a so-called clock generation device such as a crystal oscillator module, a pulse generator, or a function generator as described above. Further, the AIS signal generation unit 109 is implemented by a frequency dividing circuit as described above. However, the present invention is not limited thereto, and the respective processing unit may be configured by loading a predetermined program or the like into an arithmetic unit such as a CPU.

Here, further detailed description is given of specific operations performed by the shelf 1 and the shelf dependent thereon when the N-system clock 121 is interrupted.

When the N-system clock 121 from the upstream shelf or the DCS is interrupted, the shelf 1 senses that the N-system clock 121 has not been input for a predetermined period (for example, three-clock cycle), and the clock interruption detection unit 101 detects that the N-system clock has been interrupted. This causes the clock interruption detection unit 101 to start outputting the interruption detection signal 124. The intra-own shelf clock selection unit 105 that has received the interruption detection signal 124 switches the clock to be output from the N-system clock 121 to the E-system clock 122. Further, the N-system clock selection unit 106 that has received the interruption detection signal 124 switches the clock to be distributed to the downstream shelf from the N-system clock 121 to the AIS signal 125. This effects an alarm transfer of the AIS signal 125 to the downstream shelf. Note that, the E-system clock selection unit 107 that has received the interruption detection signal 124 maintains the E-system clock 122 as the clock being distributed to the downstream shelf.

Meanwhile, the alarm notification masking unit 102 that has received the interruption detection signal 124 has not yet received the masking instruction signal 123 from the AIS signal detection unit 108, and hence outputs to the alarm determination processing unit 103 the alarm notification indicating that the N-system clock has been interrupted. The alarm notification is continued unless the AIS signal is received on the clock line, and hence the alarm determination processing unit 103 continuously receives the alarm output indicating the N-system clock interruption from the alarm notification masking unit 102 for equal to or longer than the predetermined notification protection period. The alarm determination processing unit 103 generates the alarm information including the information identifying the system for which the alarm output has been issued and the information indicating that the clock interruption has occurred in the identified system, and notifies the device management system thereof.

In other words, the alarm notification is output from the shelf 1, which has detected the clock interruption on the clock line and which has not detected the AIS signal on the clock line, to the device management system.

Next, description is given of an operation of the downstream shelf dependent on the shelf 1 that has detected the clock interruption. On the downstream shelf, instead of the N-system clock 121, the AIS signal 125 transferred from the upstream shelf that has detected the interruption of the N-system clock is received through the clock line. The AIS signal detection unit 108 of the downstream shelf detects the AIS signal and outputs the masking instruction signal 123. Meanwhile, the clock interruption detection unit 101 of the downstream shelf receives the AIS signal on the clock line instead of the N-system clock 121. However, as described above, the AIS signal is a signal having a particular pattern from which it is determined that the N-system clock has been interrupted, in other words, a frequency division signal of the N-system clock which has a cycle equal to or longer than twice as long as the interruption detection period, and hence the clock interruption detection unit 101 of the downstream shelf detects that the N-system clock has been interrupted and starts outputting the interruption detection signal 124.

The intra-own shelf clock selection unit 105 of the downstream shelf which has received the interruption detection signal 124 switches the clock to be output from the N-system clock 121 to the E-system clock 122. Further, the N-system clock selection unit 106 that has received the interruption detection signal 124 switches the clock to be distributed to the downstream shelf from the N-system clock 121 to the AIS signal 125. This effects the alarm transfer of the AIS signal 125 to the further downstream shelf. Note that, the E-system clock selection unit 107 that has received the interruption detection signal 124 maintains the E-system clock 122 as the clock being distributed to the downstream shelf.

Meanwhile, the alarm notification masking unit 102 of the downstream shelf which has received the interruption detection signal 124 senses that the clock has been interrupted, and receives the masking instruction signal 123 from the AIS signal detection unit 108 after a period until the AIS signal detection unit 108 senses the AIS signal on the clock line, in other words, with a delay of approximately several clocks. Therefore, after issuing the alarm notification to the alarm determination processing unit 103 for several clocks, the alarm notification masking unit 102 performs processing for masking the alarm notification to thereby stop the alarm notification.

Figure 7:
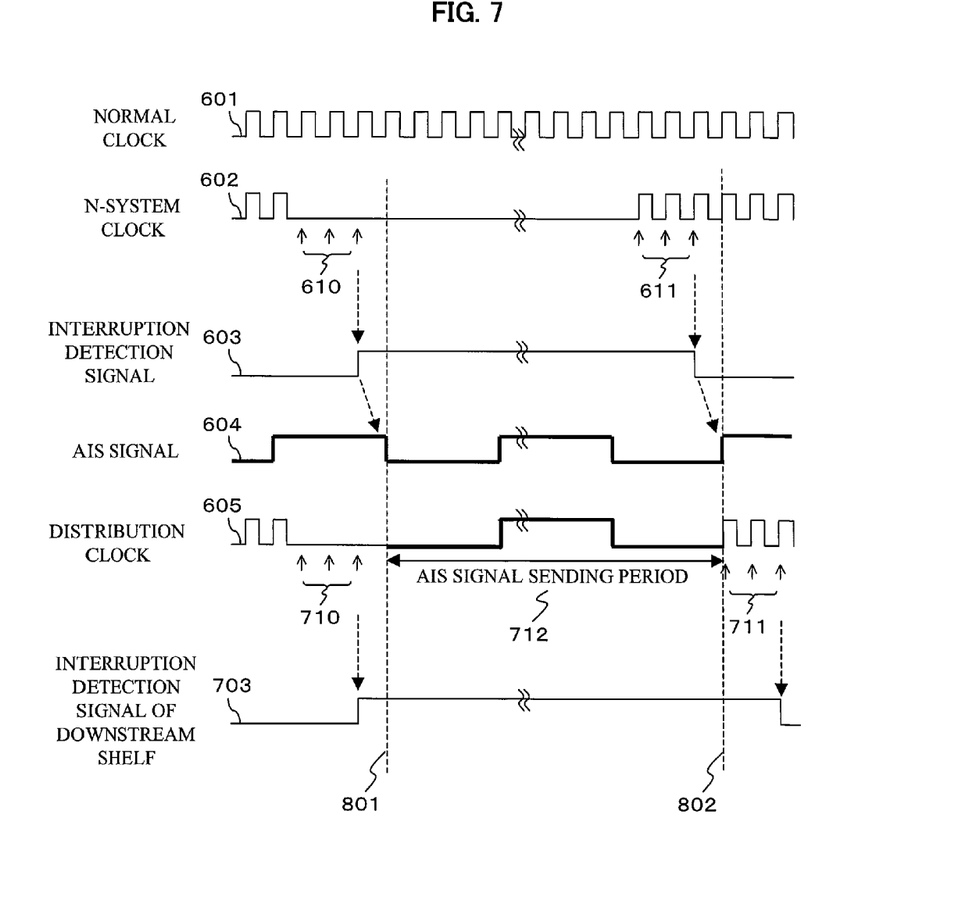
FIG. 7 is a diagram illustrating an example of a timing chart of principal signals of a network synchronization device.

FIG. 7 is a diagram illustrating an example of a timing chart of principal signals of the network synchronization device. When an N-system clock 602 becomes a signal that deviates from a normal clock 601, the clock interruption detection unit 101 fails to sense the N-system clock continuously for a predetermined interruption detection period 610, and an interruption detection signal 603 rises in the subsequent clock cycles.

Then, along with the rise of the interruption detection signal 603, the sending of an AIS signal 604 is started in the N-system clock selection unit 106, which starts an AIS signal sending period 712 for which the AIS signal 604 is sent onto the clock line as a distribution clock 605. The clock interruption detection unit 101 of the downstream shelf causes an interruption detection signal 703 to rise when the N-system clock from the distribution clock 605 fails to be sensed continuously for a predetermined interruption detection period 710.

Further, the AIS signal 604 having a cycle equal to or longer than twice as long as the interruption detection period 710 is received as a distribution clock on the clock line of the downstream shelf for the AIS signal sending period 712. Therefore, the clock interruption detection unit 101 of the downstream shelf keeps detecting the interruption of the N-system clock for the AIS signal sending period 712. In other words, an erroneous change back to the N-system clock or the like does not occur in the intra-own shelf clock selection unit 105 of the downstream shelf. Then, the alarm notification masking unit 102 of the downstream shelf receives both the interruption detection signal 124 and the masking instruction signal 123, and stops the alarm notification. That is, the alarm notification is not issued on the downstream shelf.

Next, the timing chart of FIG. 7 is used to describe a case where the N-system clock 602 recovers from the state in which the N-system clock has been interrupted. Upon detection of the continuous rise of the clock for equal to or longer than a recovery detection period 611 being the same period (three-clock cycle) as the interruption detection period 610, the clock interruption detection unit 101 stops outputting the interruption detection signal 603. The intra-own shelf clock selection unit 105 senses that the interruption detection signal 603 has stopped, and changes back the recovered N-system clock 602 as the output clock in the subsequent clock cycles. In the same manner, the N-system clock selection unit 106 changes back the output clock from the AIS signal 125 to the N-system clock.

After the AIS signal sending period 712 ends, the clock interruption detection unit 101 of the downstream shelf detects the continuous rise of the N-system clock output from the N-system clock selection unit 106 for equal to or longer than a recovery detection period 711, and stops outputting the interruption detection signal 703. In other words, on the own shelf, the AIS signal sending period 712 is started at a clock cycle 801 immediately after the interruption of the N-system clock 602 is detected, and the sending of the AIS signal is continued until the end of the AIS signal sending period 712, in other words, until a clock cycle 802 immediately after the recovery of the N-system clock 602 is detected. Further, in contrast thereto, on the downstream shelf, the AIS signal sending period 712 is provided with the same mechanism, and ends at a clock cycle immediately after the continuous N-system clock is detected for the recovery detection period 711 that follows the end of the AIS signal sending period 712 of the parent shelf.

Figure 8:
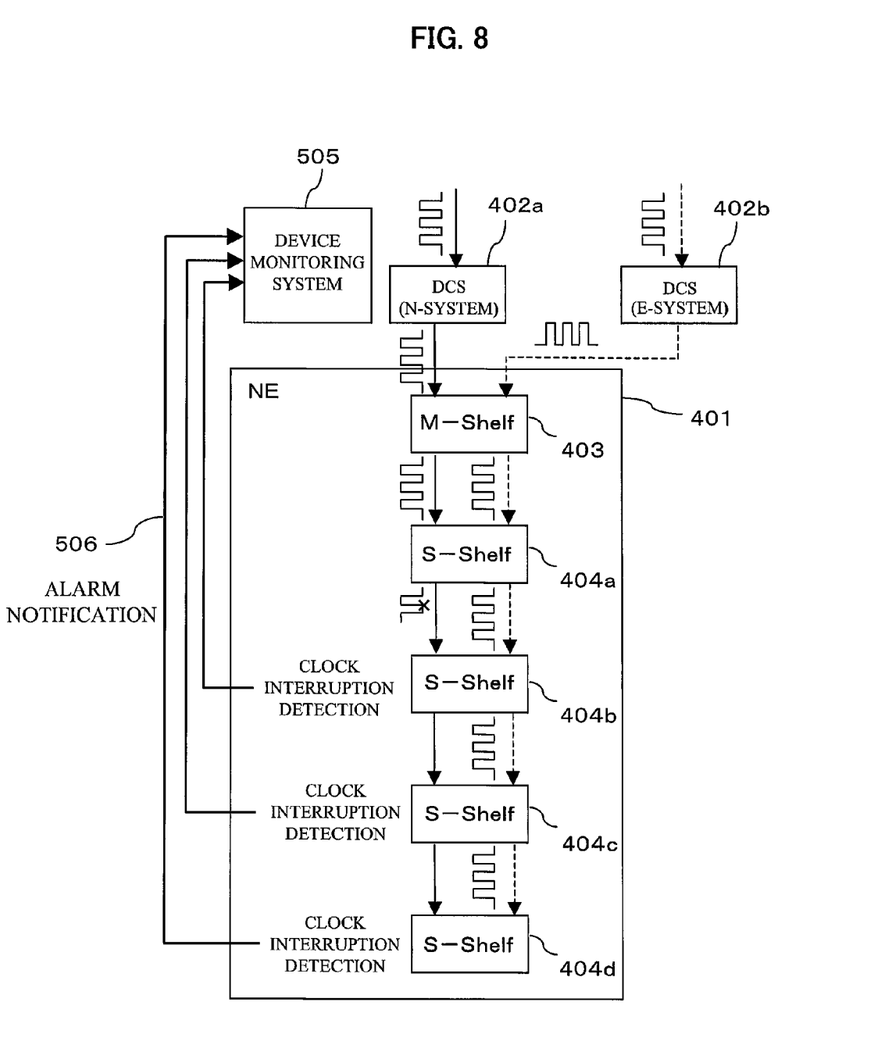
FIG. 8 is a diagram illustrating a mechanism for alarm notifications issued from cascaded network synchronization devices.

FIG. 8 is a block diagram of a system in which shelves are cascade-connected on the network synchronization device including a shelf to which the first embodiment of the present invention is not applied.

This system is configured so that an alarm notification 506 is issued to a device monitoring system 505 with regard to a network synchronization device 401 that is supplied with the N-system clock and the E-system clock by a DCS (N-system) 402*a* for distributing the N-system clock and a DCS (E-system) 402*b* for distributing the E-system clock. Here, the network synchronization device 401 includes the M-Shelf 403 as the master shelf and cascade-connected S-Shelves 404*a* to 404*d* that are slave shelves dependent on the M-Shelf 403.

In this system, the M-Shelf 403 receives the N-system clock distributed from the DCS (N-system) 402*a*, and distributes the N-system clock to the S-Shelf 404*a* through the clock line for exclusively transmitting a clock. In the same manner, the M-Shelf 403 receives the E-system clock distributed from the DCS (E-system) 402*b*, and distributes the E-system clock to the S-Shelf 404*a* through the clock line for exclusively transmitting a clock. The S-Shelf 404*a* distributes the N-system clock and the E-system clock to the S-Shelf 404*b* through the clock line for exclusively transmitting a clock. The S-Shelf 404*b* distributes the N-system clock and the E-system clock to the S-Shelf 404*c* through the clock line for exclusively transmitting a clock. The S-Shelf 404*c* distributes the N-system clock and the E-system clock to the S-Shelf 404*d* through the clock line for exclusively transmitting a clock.

In such a system for distributing the clocks, in a case where the distribution of the N-system clock has been interrupted between, for example, the S-Shelf 404*a* and the S-Shelf 404*b*, none of the S-Shelves 404*b*, 404*c*, and 404*d* can obtain the distribution of the N-system clock. Therefore, the S-Shelves 404*b*, 404*c*, and 404*d* all senses the interruption of the N-system clock, and each issue the alarm notification to the device monitoring system 505.

The notification indicating that the clock interruption has occurred is issued by the above-mentioned alarm notification, but a large number of alarm notifications, which are not always necessary, are issued to intermingle information. As a result, it may take time to grasp the situation for recovery from the clock interruption that has occurred and to perform restoration work.

Figure 9:
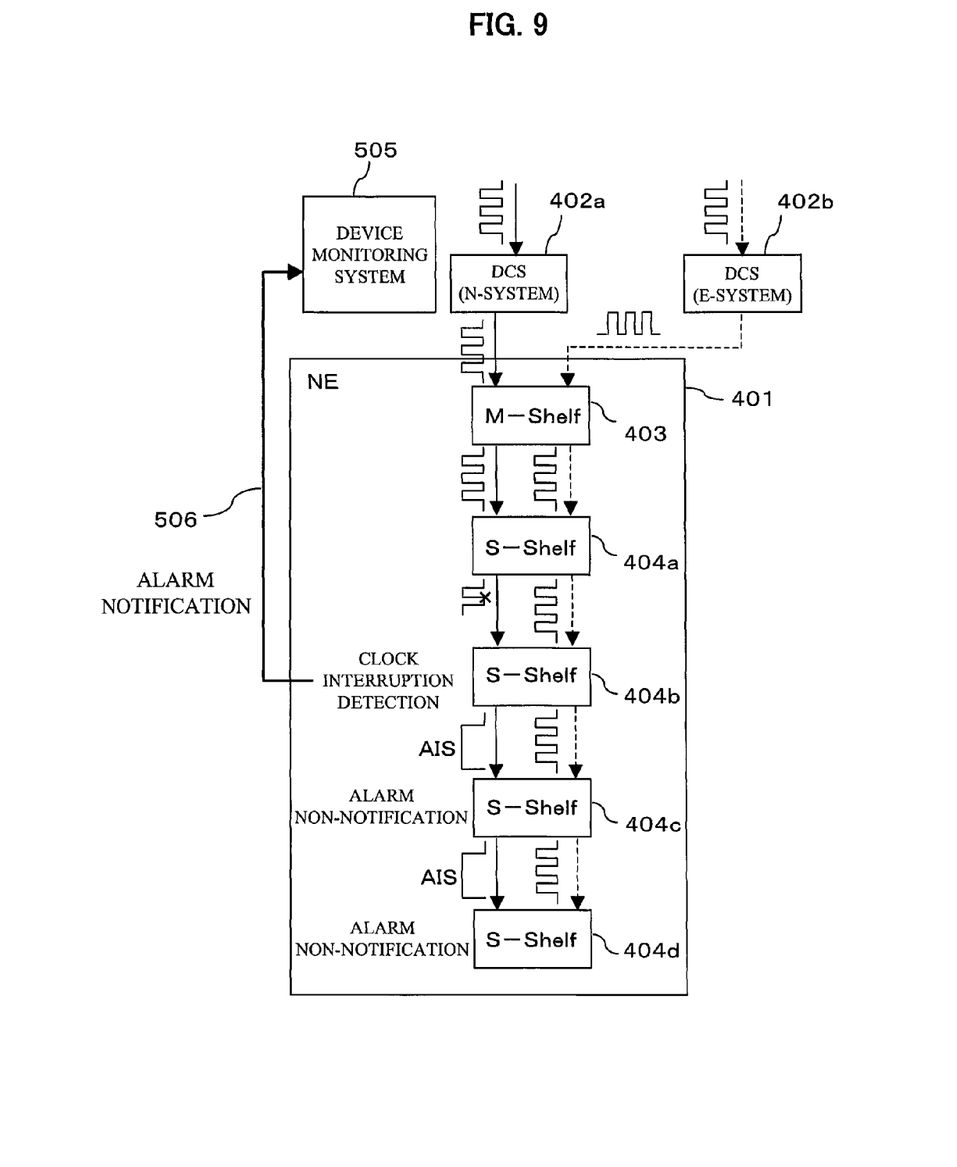
FIG. 9 is a diagram illustrating a mechanism for the alarm notification of the network synchronization device.

In contrast thereto, as illustrated in FIG. 9, on the network synchronization device including the shelf 1 to which the first embodiment of the present invention is applied, irrespective of the cascade connection of the shelves 1, the alarm notification 506 is issued only from the most upstream S-Shelf 404*b* that has detected the clock interruption, and on the S-Shelves 404*c* and 404*d* dependent on the S-Shelf 404*b*, the alarm notification is not issued because the AIS signal is detected. Therefore, the portion of the clock interruption becomes clear at a glance, and it is possible to extremely reduce the period required to grasp the situation and the restoration work, which can speed up fault recovery.

Described above is the network synchronization device including the shelf 1 to which the first embodiment of the present invention is applied. According to the network synchronization device to which the first embodiment is applied, when the clock interruption occurs, it is possible to interrupt an unnecessary alarm notification issued on the shelf dependent on the shelf that has sensed the clock interruption to thereby quickly identify a failure site.

Next, a shelf 1000 constituting a network synchronization device to which a second embodiment according to the present invention is applied is described with reference to the accompanying drawings.

Figure 10:
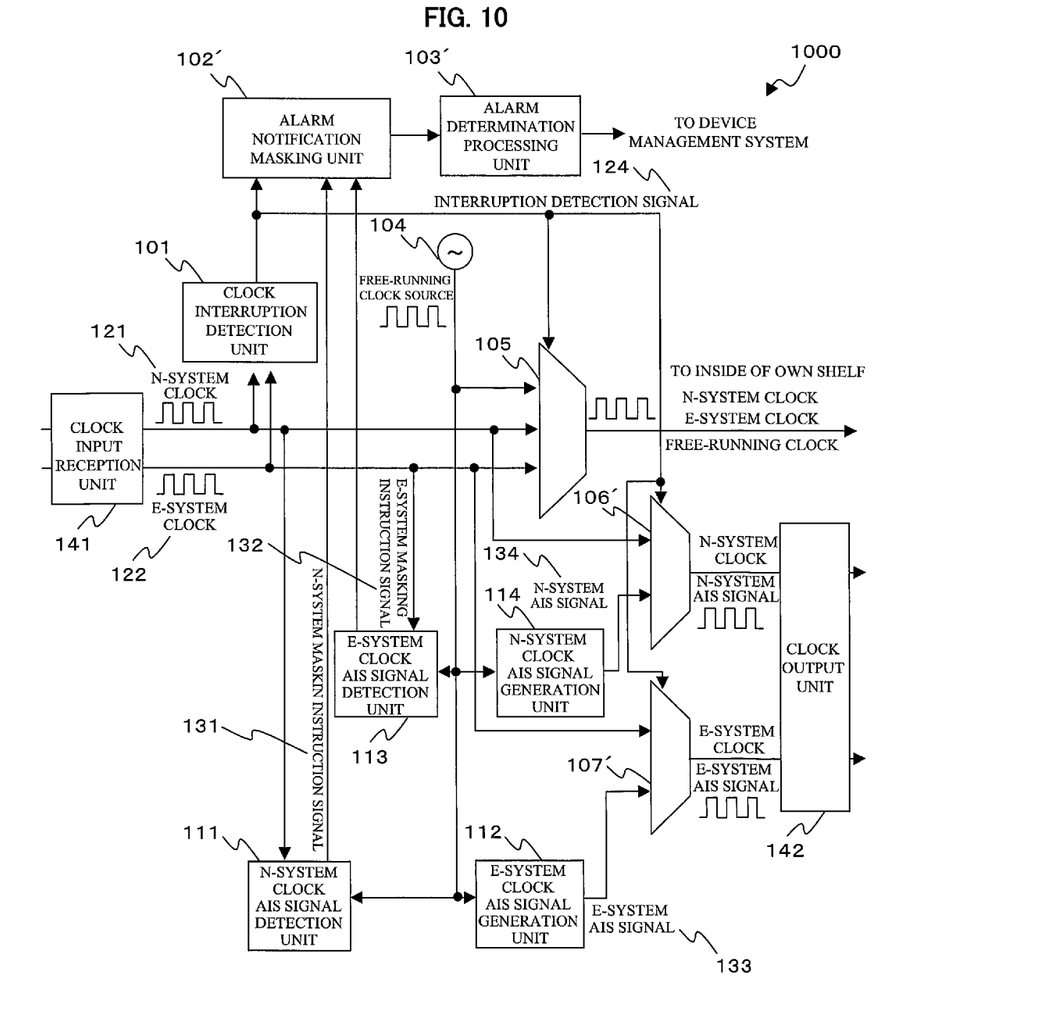
FIG. 10 is a configuration diagram of a network synchronization device according to a modified example.

FIG. 10 is a diagram illustrating the shelf 1000 constituting the network synchronization device according to the second embodiment of the present invention.

The shelf 1000 according to the second embodiment of the present invention is, in the same manner as the first embodiment, a device incorporated into the mechanism for distributing the network synchronization clocks under such a master-slave synchronization scheme as illustrated in FIG. 2. The shelf 1000 has substantially the same configuration as the first embodiment but is partially different therefrom, and the difference is mainly described below.

As illustrated in FIG. 10, the shelf 1000 includes the clock interruption detection unit 101, an alarm notification masking unit 102', an alarm determination processing unit 103', the free-running clock source 104, the intra-own shelf clock selection unit 105, an N-system clock selection unit 106', an E-system clock selection unit 107', an N-system clock AIS signal detection unit 111, an E-system clock AIS signal generation unit 112, an E-system clock AIS signal detection unit 113, an N-system clock AIS signal generation unit 114, the clock input reception unit 141, and the clock output unit 142.

The clock interruption detection unit 101, the free-running clock source 104, the intra-own shelf clock selection unit 105, the clock input reception unit 141, and the clock output unit 142 have the same configurations as those of the respective processing units according to the first embodiment, and hence description thereof is omitted.

The alarm notification masking unit 102' receives the interruption detection signal 124 output from the clock interruption detection unit 101, an N-system masking instruction signal 131 output from the N-system clock AIS signal detection unit 111, and an E-system masking instruction signal 132 output from the E-system clock AIS signal detection unit 113, and controls outputting of an alarm signal to the alarm determination processing unit 103 based on a predetermined condition.

Specifically, as illustrated in a correspondence table 400 of FIG. 5, when each of an interruption detection signal 410 of the N-system clock and an interruption detection signal 420 of the E-system clock is input from the clock interruption detection unit 101, the alarm notification masking unit 102' controls an alarm output depending on whether or not there is an interruption detection signal for the clock of each system and whether or not there is a masking instruction signal of each system.

More specifically, when the interruption detection signal of the N-system clock is input thereto, the alarm notification masking unit 102' masks an N-system alarm notification to avoid the alarm output in a case where the N-system masking instruction signal 131 is input thereto from the N-system clock AIS signal detection unit 111 (in a case where the N-system masking instruction signal is "present" 411 in FIG. 5). In contrast, the alarm notification masking unit 102' performs the alarm output without masking the N-system alarm notification in a case where the N-system masking instruction signal 131 is not input thereto from the N-system clock AIS signal detection unit 111 (in a case where the N-system masking instruction signal is "absent" 412 in FIG. 5).

In the same manner, when the interruption detection signal of the E-system clock is input thereto, the alarm notification masking unit 102' masks an E-system alarm notification to avoid the alarm output in a case where the E-system masking instruction signal 132 is input thereto from the E-system clock AIS signal detection unit 113 (in a case where the E-system masking instruction signal is "present" 421 in FIG. 5). In contrast, the alarm notification masking unit 102' performs the alarm output without masking the E-system alarm notification in a case where the E-system masking instruction signal 132 is not input thereto from the E-system clock AIS signal detection unit 113 (in a case where the E-system masking instruction signal is "absent" 422 in FIG. 5).

The alarm determination processing unit 103' acquires alarm output information from the alarm notification masking unit 102', and when the alarm output information satisfies the predetermined condition, outputs alarm information to a device management system (not shown). Specifically, when the alarm output regarding the clock interruptions of the N-system and the E-system from the alarm notification masking unit 102' is continuously received for equal to or longer than a predetermined notification protection period (for example, period equal to or longer than twice as long as a period sufficient for any one of an E-system AIS signal 133 and an N-system AIS signal 134, which are described later, that has the lower frequency to rise from the clock interruption, such as 20-clock cycle), the alarm determination processing unit 103' generates the alarm information including information identifying the system for which the alarm output has been issued and information indicating that the clock interruption has occurred in the identified system, and notifies the device management system thereof.

The N-system clock selection unit 106' selectively outputs any one of the N-system clock 121 and an N-system AIS signal 134 output from the N-system clock AIS signal generation unit 114 as the input clock. The N-system clock selection unit 106' receives the interruption detection signal 124 and selects the clock to be output based on the interruption detection signal. The N-system clock selection unit 106' outputs the N-system clock 121 when the interruption detection signal 124 is a signal indicating that none of the N-system clock 121 and the E-system clock 122 has been interrupted or a signal indicating that only the E-system clock 122 has been interrupted, or outputs the N-system AIS signal 134 as the output clock when the interruption detection signal 124 is the signal indicating that only the N-system clock 121 has been interrupted or the signal obtained by detecting that both the N-system clock 121 and the E-system clock 122 have been interrupted.

The E-system clock selection unit 107' selectively outputs any one of the E-system clock 122 and an E-system AIS signal 133 output from the E-system clock AIS signal generation unit 112 as the input clock. The E-system clock selection unit 107' receives the interruption detection signal 124 and selects the clock to be output based on the interruption detection signal. The E-system clock selection unit 107' outputs the E-system clock 122 when the interruption detection signal 124 is a signal indicating that none of the N-system clock 121 and the E-system clock 122 has been interrupted or a signal indicating that only the N-system clock 121 has been interrupted, or outputs the E-system AIS signal 133 as the output clock when the interruption detection signal 124 is the signal indicating that only the E-system clock 122 has been interrupted or the signal obtained by detecting that both the N-system clock 121 and the E-system clock 122 have been interrupted.

The N-system clock AIS signal detection unit 111 monitors the transfer of the AIS signal on the N-system clock line, and upon detection of a signal having the same cycle as an N-system AIS signal having a predetermined cycle (for example, eight-clock cycle), outputs an N-system masking instruction signal 131 to the alarm notification masking unit 102'. Note that, the N-system clock AIS signal detection unit 111 finishes outputting the N-system masking instruction signal 131 when the N-system AIS signal is no longer detected and when a normal clock is detected for a predetermined period (for example, three cycles).

The E-system clock AIS signal generation unit 112 is supplied with the free-running clock by the free-running clock source 104, and generates an E-system AIS signal 133 having a predetermined frequency (for example, frequency $1/10$ as large as the free-running clock) to be output to the E-system clock selection unit 107'. Although not particularly shown, the E-system clock AIS signal generation unit 112 includes a frequency dividing circuit which is a different from that of FIG. 6A only in the frequency division ratio. In other words, in the E-system clock AIS signal generation unit 112, the free-running clock input from the input transmission line 115 is $1/10$-frequency-divided, in other words, has the frequency changed to a lower level, and is output from the output transmission line 117 as an E-system AIS signal. Note that, the frequency division ratio at which the E-system clock AIS signal generation unit 112 frequency-divides the free-running clock is not limited to the above-mentioned $1/10$ frequency division. For example, the frequency division ratio may be set so that the E-system AIS signal 133 has a cycle equal to or longer than twice as long as the interruption detection period, for which the clock interruption detection unit 101 detects the clock interruption, and is different from the N-system AIS signal 134 output from the N-system clock AIS signal generation unit 114. It is desired that the frequency division ratio may be provided so that the E-system AIS signal 133 has a cycle equal to or longer than approximately twice as long as clocks obtained by adding a one-clock cycle to the interruption detection period and has a cycle different from the N-system AIS signal described later.

The E-system clock AIS signal detection unit 113 monitors the transfer of the AIS signal on the E-system clock line, and upon detection of a signal having the same cycle as an E-system AIS signal having a predetermined cycles (for example, 10-clock cycle), outputs an E-system masking instruction signal 132 to the alarm notification masking unit 102'. Note that, the E-system clock AIS signal detection unit 113 finishes outputting the E-system masking instruction signal 132 when the E-system AIS signal is no longer detected and when a normal clock is detected for a predetermined period (for example, three cycles).

The N-system clock AIS signal generation unit 114 is supplied with the free-running clock by the free-running clock source 104, and generates an N-system AIS signal 134 having a predetermined frequency (for example, frequency $1/8$ as large as the free-running clock) to be output to the N-system clock selection unit 106'. Although not particularly shown, the N-system clock AIS signal generation unit 114 includes a frequency dividing circuit which is the same as that of FIG. 6A. In other words, in the N-system clock AIS signal generation unit 114, the free-running clock input from the input transmission line 115 is $1/8$-frequency-divided, in other words, has the frequency changed to a lower level, and is output from the output transmission line 117 as an N-system AIS signal. Note that, the frequency division ratio at which the N-system clock AIS signal generation unit 114 frequency-divides the free-running clock is not limited to the above-mentioned ⅛ frequency division. For example, the frequency division ratio may be set so that the N-system AIS signal 134 has a cycle equal to or longer than twice as long as the interruption detection period, for which the clock interruption detection unit 101 detects the clock interruption, and is different from the E-system AIS signal 133 output from the E-system clock AIS signal generation unit 112. It is desired that the frequency division ratio may be provided so that the N-system AIS signal 134 has a cycle approximately twice as long as clocks obtained by adding a one-clock cycle to the interruption detection period.

Described above is the network synchronization device including the shelf 1000 to which the second embodiment of the present invention is applied. According to the network synchronization device to which the second embodiment is applied, when the clock interruption occurs, it is possible to interrupt an unnecessary alarm notification issued on the shelf dependent on the shelf that has sensed the clock interruption to thereby quickly identify a failure site. In addition, according to the network synchronization device to which the second embodiment is applied, the generated AIS signals sent to dependent shelves are AIS signals having different frequencies between the case of the N-system clock interruption and the case of the E-system clock interruption, and it is possible to discriminate between the AIS signals for the N-system clock and the E-system clock. With this configuration, for example, in a case where cables for clock distribution or the like are laid in a stage of installing network device equipment, it is possible to easily sense even a trouble in connection which occurs when an N-system cable and an E-system cable are connected inversely. In other words, it is possible to discriminate between the N-system AIS signal 134 and the E-system AIS signal 133, and hence it is possible to confirm in advance whether or not the cable is normally connected, whether or not a failure of a line break has occurred, and the like.

Further, in the case where the cables for clock distribution or the like are laid in the stage of installing the network device equipment, the reference clock has not been input to the upstream master shelf yet, and both the N-system clock and the E-system clock are being interrupted. Therefore, the N-system clock selection unit 106' and the E-system clock selection unit 107' transfer the AIS signals generated in the N-system clock AIS signal generation unit 114 and the E-system clock AIS signal generation unit 112, respectively, as the distribution clocks to the downstream shelf. In a case where the cascade connection is normally effected, on the downstream shelf, the N-system clock AIS signal detection unit 111 and the E-system clock AIS signal detection unit 113 each detect the AIS signal of each system. However, the N-system clock AIS signal detection unit 111 and the E-system clock AIS signal detection unit 113 output the N-system masking instruction signal 131 and the E-system masking instruction signal 132, respectively, to the alarm notification masking unit 102', and hence the device management system is not notified of an alarm.

Meanwhile, in a case where the N-system and E-system clock lines are erroneously cascade-connected between any two of the shelves, or in a case where a break in the clock line has occurred, the N-system clock AIS signal detection unit 111 cannot sense the E-system AIS signal, and the E-system clock AIS signal detection unit 113 cannot sense the N-system AIS signal. Therefore, none of the N-system masking instruction signal 131 and the E-system masking instruction signal 132 is output to the alarm notification masking unit 102'. As a result, the clock interruption detection unit 101 detects that the clock has been interrupted and outputs the interruption detection signal 124, and the alarm notification masking unit 102' outputs the alarm notification. Upon reception of the interruption detection signal 124, the N-system clock selection unit 106' and the E-system clock selection unit 107' each transfer the AIS signal of the system, which is to be originally transferred, as the distribution clock to the downstream shelf. In this manner, when the cascade connection is normally effected on the further downstream shelf, on the downstream shelf, the alarm notification is not issued to the device management system. Therefore, an erroneously-connected part or a failure part of the break in the cable can easily be identified and is also confirmed in advance before operation is started.

The present invention is not limited to the above-mentioned first embodiment and second embodiment. Various modifications can be made to each of the above-mentioned embodiments within the scope of technical ideas of the present invention. For example, in the above-mentioned first embodiment and second embodiment, it is identified that the clock and the AIS signal are output onto the clock line used for exclusively transmitting a clock. However, the present invention is not limited thereto, and the clock and the AIS signal may be output onto the data communication line (not shown). Accordingly, the shelves can be arranged more flexibly.

However, when the above-mentioned modification is employed, the shelves are arranged more flexibly, but compared to those using the dedicated clock lines, there is a fear that the detection of the clock interruption may be delayed by superimposing clock information on a data line. In other words, there is a fear that the detection of the clock interruption may be delayed due to a delay in data frame retransmission control or the like on the data line, discarding of a frame in terms of a communication protocol, and the like.

Further, the modification of the above-mentioned embodiment may be applied solely or a combination of parts thereof may be applied.

The present invention has been described above by referring mainly to the embodiments. According to the embodiments of the present invention, the shelves can be cascade-connected because the processing unit for detecting the AIS signal from the upstream device and the processing unit for generating the AIS signal to be transmitted to the downstream shelf are provided within each shelf. Further, on the downstream shelf, the alarm notification can be suppressed by detecting the AIS signal along with the detection of the clock interruption. Further, in the case where the state in which a normal clock is being detected is recovered from the clock interruption, all the shelves dependent on the downstream shelf can be quickly recovered without performing particular processing. Further, the dedicated clock line is used to transmit the clock and the AIS signal, which can speed up the detection of the clock interruption and suppress influences on the data communications.

What is claimed is:

1. A shelf of a network synchronization device, comprising:
   a clock input reception unit which receives an input of a clock signal;
   a clock output unit which outputs a clock signal;
   a clock interruption detection unit which detects a clock interruption in a case where the clock input reception unit does not receive a clock;

an AIS signal detection unit which detects an AIS signal in a case where the AIS signal is received through the clock input reception unit;
an AIS signal generation unit which generates the AIS signal;
an alarm control unit which outputs a predetermined alarm notification when the AIS signal detection unit does not detect the AIS signal in a case where the clock interruption detection unit detects the clock interruption; and
an output signal selection unit which outputs the AIS signal generated by the AIS signal generation unit to the clock output unit in the case where the clock interruption detection unit detects the clock interruption,
wherein the clock interruption detection unit sends an interruption detection signal to the alarm control unit and the output signal selection unit when detecting the clock interruption,
wherein the AIS signal detection unit sends a masking instruction signal to the alarm control unit when detecting the AIS signal,
wherein the alarm control unit outputs the predetermined alarm notification depending on presence/absence of the interruption detection signal and the masking instruction signal, and
wherein the output signal selection unit outputs the AIS signal to the clock output unit when receiving the interruption detection signal.

2. A shelf according to claim 1, further comprising a free-running clock source which generates a clock independently,
wherein the AIS signal generation unit generates the AIS signal by converting a frequency of the clock sent from the free-running clock source.

3. A shelf according to claim 2, wherein the AIS signal generation unit generates the AIS signal by frequency-dividing the clock sent from the free-running clock source.

4. A shelf according to claim 3, wherein:
the clock interruption detection unit detects the clock interruption in a case where the clock input reception unit does not receive the input of the clock continuously for a predetermined period; and
the AIS signal generation unit frequency-divides the clock sent from the free-running clock source at a frequency division ratio which is set so that the AIS signal has a cycle at least twice as long as the predetermined period for which the clock interruption detection unit detects the clock interruption.

5. A shelf according to claim 1, wherein the alarm control unit outputs the predetermined alarm notification unless the AIS signal detection unit detects the AIS signal after a predetermined period has elapsed since the clock interruption detection unit detects the clock interruption.

6. A shelf according to claim 1, wherein:
the clock input reception unit receives two kinds of clock signals synchronized with each other; and
the clock output unit comprises:
an internal clock output unit which outputs the clock signal to an inside of the shelf; and
an external clock output unit which outputs the clock signal to another shelf.

7. A shelf according to claim 6, wherein:
the external clock output unit comprises:
a first output unit which outputs one of the two kinds of clock signals received by the clock input reception unit; and
a second output unit which outputs another one of the two kinds of clock signals that is different from the one output from the first output unit;
the first output unit selectively outputs any one of the one of the two kinds of clock signals and the AIS signal generated by the AIS signal generation unit; and
the second output unit selectively outputs any one of the another one of the two kinds of clock signals and the AIS signal generated by the AIS signal generation unit.

8. A shelf according to claim 7, wherein:
the first output unit outputs the AIS signal generated by the AIS signal generation unit when the clock interruption detection unit detects the clock interruption of the one of the two kinds of clock signals; and
the second output unit outputs the AIS signal generated by the AIS signal generation unit when the clock interruption detection unit detects the clock interruption of the another one of the two kinds of clock signals.

9. A shelf according to claim 7 or 8, wherein:
the AIS signal generation unit generates two different kinds of AIS signals;
the first output unit selectively outputs any one of the one of the two kinds of clock signals and one of the two different kinds AIS signals generated by the AIS signal generation unit; and
the second output unit selectively outputs any one of the another one of the two kinds of clock signals and another one of the two different kinds AIS signals generated by the AIS signal generation unit.

10. A network synchronization device, comprising at least two shelves each comprising:
a clock input reception unit which receives an input of a clock signal;
a clock output unit which outputs a clock signal;
a clock interruption detection unit which detects a clock interruption in a case where the clock input reception unit does not receive a clock;
an AIS signal detection unit which detects an AIS signal in a case where the AIS signal is received through the clock input reception unit;
an AIS signal generation unit which generates the AIS signal;
an alarm control unit which outputs a predetermined alarm notification when the AIS signal detection unit does not detect the AIS signal in a case where the clock interruption detection unit detects the clock interruption; and
an output signal selection unit which outputs the AIS signal generated by the AIS signal generation unit to the clock output unit in the case where the clock interruption detection unit detects the clock interruption, the at least two shelves comprising:
a first shelf; and
a second shelf, wherein:
the clock input reception unit of the first shelf receives a clock signal from an external device; and
the clock output unit of the first shelf outputs any one of the clock signal and the AIS signal generated by the AIS signal generation unit to the second shelf,
wherein, on each of the first shelf and the second shelf:
the clock interruption detection unit sends an interruption detection signal to the alarm control unit and the output signal selection unit when detecting the clock interruption;
the AIS signal detection unit sends a masking instruction signal to the alarm control unit when detecting the AIS signal;
the alarm control unit outputs the predetermined alarm notification depending on presence/absence of the interruption detection signal and the masking instruction signal; and the output signal selection unit outputs the AIS signal to the clock output unit when receiving the interruption detection signal.

11. A network synchronization device according to claim 10, wherein:
the first shelf and the second shelf each further comprise a free-running clock source which generates a clock independently;
on each of the first shelf and the second shelf, the AIS signal generation unit generates the AIS signal by converting a frequency of the clock sent from the free-running clock source.

12. A network synchronization device according to claim 11, wherein, on each of the first shelf and the second shelf, the AIS signal generation unit generates the AIS signal by frequency-dividing the clock sent from the free-running clock source.

13. A network synchronization device according to claim 12, wherein, on each of the first shelf and the second shelf:
the clock interruption detection unit detects the clock interruption in a case where the clock input reception unit does not receive the input of the clock continuously for a predetermined period; and
the AIS signal generation unit frequency-divides the clock sent from the free-running clock source at a frequency division ratio which is set so that the AIS signal has a cycle at least twice as long as the predetermined period for which the clock interruption detection unit detects the clock interruption.

* * * * *